United States Patent
Warn (10) Patent No.: US 7,911,740 B2
(45) Date of Patent: Mar. 22, 2011

(54) APPARATUS AND METHOD FOR RECEIVING AND POSITIONING A READ/WRITE HEAD TO A DISK IN A TEST APPARATUS

(75) Inventor: Ian Stanley Warn, Southampton (GB)

(73) Assignees: Xyratex Technology Limited, Havant (GB); Seagate Technology LLC, Scotts Valley, CA (US)

( * ) Notice: Subject to any disclaimer, the term of this patent is extended or adjusted under 35 U.S.C. 154(b) by 1187 days.

(21) Appl. No.: 11/517,581

(22) Filed: Sep. 8, 2006

(65) Prior Publication Data

US 2008/0062564 A1  Mar. 13, 2008

(51) Int. Cl.
*G01R 33/00* (2006.01)
*G11B 15/10* (2006.01)

(52) U.S. Cl. .................. 360/137; 324/210; 324/262
(58) Field of Classification Search .................. None
See application file for complete search history.

(56) References Cited

U.S. PATENT DOCUMENTS

| | | | |
|---|---|---|---|
| 5,315,372 A | 5/1994 | Tsai | |
| 5,696,653 A | 12/1997 | Lacey | |
| 5,774,295 A | 6/1998 | Tsai | |
| 5,786,963 A | 7/1998 | Malek | |
| 6,229,664 B1 | 5/2001 | Albrecht | |
| 6,531,867 B1 | 3/2003 | Greene | |
| 6,603,629 B1 | 8/2003 | Tsai | |
| 6,867,949 B1 | 3/2005 | Guo | |
| 2002/0018314 A1 | 2/2002 | Takano | |
| 2002/0021523 A1 | 2/2002 | Ishizuka | |
| 2002/0053251 A1 | 5/2002 | Bernard | |
| 2004/0183532 A1* | 9/2004 | Mori et al. | 324/262 |
| 2005/0209797 A1 | 9/2005 | Anderson | |

FOREIGN PATENT DOCUMENTS

EP   530 698   3/1993

OTHER PUBLICATIONS

European Search Report dated Jul. 6, 2007 3 pages.

* cited by examiner

*Primary Examiner* — Craig A. Renner
*Assistant Examiner* — Tamara Ashford
(74) *Attorney, Agent, or Firm* — Pillsbury Winthrop Shaw Pittman LLP (57) ABSTRACT

Apparatus for receiving and positioning a read/write head to a disk in a test apparatus has a deck and a spindle on the deck and on which a disk can be mounted for rotation of the disk. A gripper is provided for holding a head during testing, the gripper being movable over a surface of the deck. A precisor receives a head and accurately aligns the head, the precisor being movable over a surface of the deck. A pick is operable to pick up and place down a head. The precisor is movable to a position where the pick can pick up a head from the precisor and place down a head on the precisor. The gripper is movable to a position where the pick can pick up a head from the gripper and place down a head on the gripper.

20 Claims, 5 Drawing Sheets

APPARATUS AND METHOD FOR RECEIVING AND POSITIONING A READ/WRITE HEAD TO A DISK IN A TEST APPARATUS

TECHNICAL FIELD

The present invention relates to apparatus and a method for receiving and positioning a read/write head to a disk in a test apparatus. In preferred embodiments, the present invention relates to a so-called spinstand.

BACKGROUND

It is well known to use a spinstand to test various components of a hard disk assembly, such as in particular the read/write heads and the disk media. Such tests can be carried out in a manufacturing production environment, where typically every head and a proportion of disks are tested prior to being assembled into a hard disk assembly to ensure that they perform to the required standard. Testing using a spinstand can also be carried out in a research and development setting.

A spinstand typically comprises a deck, for example of granite, which is generally isolated from external sources of vibration in some way to avoid these affecting the accuracy of the test results. A spindle is attached to the deck for holding and rotating the disk. This will typically be an air bearing spindle with an integrated DC brushless motor.

The spinstand also has a so-called "test nest" which is adapted to hold the read/write head during testing and to make electrical connections to the head. The test nest is mounted on a puck that is movable on the surface of the deck, typically on an air bearing, so as to be capable of moving the head to a desired location under the surface of the disk. The puck is typically positioned by a highly accurate x-y positional stage, also supported by air bearings and having linear encoders to allow the position of the puck to be highly accurately determined. It may also be possible to lock down the puck and/or elements of the x-y stage to the granite by application of a vacuum in order to prevent movement of the puck when in a desired position. The puck generally has some arrangement for loading/unloading the head to/from the test surface of the disk to allow the head to read from and/or write to a track of test data on the test surface of the disk. The puck also generally has some arrangement, such as a nanopositioner disposed between the puck and the test nest, for making very fine positional changes of the head relative to the test track.

When testing a head with a spinstand it is important that the head is positioned with great accuracy relative to the disk. It is therefore important that the head be loaded to the test nest with great positional accuracy. It is also important that the positioning of successively tested heads is consistently repeatable. In particular, it is important to control the x-y position of the head (i.e. the position of the head in the x-y plane parallel to the disk surface) and the theta position of the head (i.e. the rotational position of the head in the x-y plane). Discrepancies in the x-y positioning of the head affects the ability of the apparatus to position the head over a test track of data on the disk. Discrepancies in the theta positioning affects the skew of the head when positioned over a test track on the disk, which in turn affects the characterisation of the head.

When testing a read/write head with a spinstand in a production environment the test apparatus typically comprises a spinstand in combination with a receiving stage where heads are loaded and unloaded to the apparatus, and automation for moving heads between various areas in the spinstand and the receiving stage. The heads to be tested are usually delivered to the receiving stage in the form of head gimbal assemblies (HGAs) arranged in a tray. The tray will hold for example 10 or 20 HGAs arranged in a row. The automation includes a highly accurate linear actuator which extends above the relevant parts of the spinstand and has a pick device for picking up and subsequently placing down HGAs along its path.

To load a HGA to the apparatus, the linear actuator moves the pick device to above the tray which is received in the receiving stage and the pick device picks up an individual HGA. The pick device then moves the head to a so-called precisor. The precisor is normally mounted to the deck and is arranged to "precise" (i.e. finely position) the HGA in x, y and theta positions. Since the precisor and the spindle are both registered to each other via the deck, once the HGA is finely positioned by the precisor, its position relative to the spindle and thereby to the disk are set. Once the head has been précised, the pick device picks up the HGA from the precisor and transfers it to the test nest of the puck. The test nest usually has a collet arrangement for clasping the boss hole of the base plate of the HGA in order to hold the HGA in position. The head is then loaded to the disk for testing.

A drawback of this automation is the vibration that it generates. It is important to isolate the spinstand from vibration as much as possible as vibration can affect the accuracy of the test results. It has therefore been proposed to isolate the automation from the deck of the spinstand. However, isolating the automation from the spinstand means that the automation cannot place the HGA on the precisor with the same accuracy. Also, when transferring the HGA from the precisor to the test nest with the automation, the accuracy of the fine positioning achieved by the precisor is to some extent lost when the automation is isolated from the deck.

Another disadvantage of the automation described above is that the highly accurate linear actuator used to move the HGA around the apparatus is expensive. For this reason, it is not generally used in a research and development setting, where speed of swapping heads is generally of less importance and so does not justify the expense. Accordingly, in a non-production spinstand the HGAs are usually manually precised and manually loaded to the spinstand. This is done by first mounting the HGA in a cartridge or block (typically a block of stainless steel) away from the spinstand. In so doing, the operator will align the HGA to the cartridge with great precision, for example with the aid of a microscope. The cartridge is then attached to the test nest of the spinstand in such a way that the cartridge is keyed with the test nest. Thus the HGA is mounted to the puck in such a way that the position and orientation of the head is known. The disadvantage of this technique is that the alignment process is labour intensive and time consuming, and requires a skilled operator on hand to perform correctly.

A further drawback of this technique is that the production spinstand and the research and development spinstand have less parts in common due to the different way in which the HGA is attached to the test nest. It is generally desirable to have as many parts in common as possible between a spinstand intended for production testing and research and development testing.

SUMMARY

According to a first aspect of the present invention, there is provided apparatus for receiving and positioning a read/write head to a disk in a test apparatus, the apparatus comprising: a deck; a spindle on the deck and on which a said disk can be mounted for rotation of the disk; a gripper for holding a said head during testing, the gripper being movable over a surface of the deck; a precisor for receiving a said head and accurately aligning a said head, the precisor being movable over a surface of the deck; and, a pick operable to pick up and place down a said head; the precisor being movable to a position where the pick can pick up a said head from the precisor and place down a said head on the precisor; the gripper being movable to a position where the pick can pick up a said head from the gripper and place down a said head on the gripper.

This allows a head to be moved from the precisor, where it is accurately aligned, to the gripper, from where it is loaded to the disk, without the need for expensive additional automation. This is due to the precisor as well as the gripper being selectively movable over the deck to a position where the pick can operate to pick up or place down a head. As will be discussed further below, in an embodiment, the precisor and the gripper are mounted on a puck that is provided in some typical spinstands already and which has the ability to be positioned highly accurately in the x-y plane of the deck. Thus the pick can be used to lift the head from the precisor and the puck can then be moved to position the gripper underneath the raised head. The pick then sets the head back down on the gripper. The pick maintains the orientation of the head that was achieved by the precisor in this process. Thus, the pick need not be attached to expensive automation as in the prior art, since in this arrangement the pick can stay stationary and the existing spinstand puck positioner can be used to move the precisor and gripper in turn under the pick where the head is set down or picked up.

This arrangement also partially automates the process of precising the head so that it is not necessary for the operator to undertake the labour-intensive manual orientation of the head relative to a mounting cartridge. Indeed, the cartridge can be dispensed with altogether. This advantageously provides a spinstand that can be adapted for use with automation in a manufacturing environment and for manual head loading in a research and development environment with minimal adaptation being needed.

In an embodiment, the pick is operable to pick up a said head from the gripper. This allows the head to be returned from the gripper to an unload position.

In an embodiment, the pick is in a fixed position relative to the deck. Since the gripper and precisor are movable and can be used for all translational movement needed in moving the head from point to point, the pick can be in a fixed position to the deck. Keeping the pick in a fixed position has the advantage of maintaining the accuracy of the positioning of the head achieved by the precisor when moving the head to the gripper.

In an embodiment the pick comprises: a kicker capable of movement in a substantially vertical direction; and, an end effector attached to the kicker capable of holding a said head. The vertical movement can also be used to urge the head against the precisor to aid in the fine positioning process, and also to prevent movement of the head from its précised position whilst the end effector establishes its hold on the head.

In an embodiment, the end effector is arranged to hold a said head in the Z-direction whilst allowing at least some degree of x-y movement and swivelling of the head to aid the fine positioning of the head when the head is placed on the precisor. This allows the end effector to maintain a hold on the head whilst permitting the head to move sufficiently to be précised by the precisor.

In an embodiment, the end effector comprises at least one vacuum port for applying a vacuum to a said head in order to hold a said head.

In an embodiment, the apparatus comprises a positioning stage on the deck for moving at least one of the gripper and the precisor relative to the deck.

In an embodiment, the pick is mounted on a member that holds an inverted spindle. (An inverted spindle is a spindle that is mounted in an inverted position, i.e. the end of the spindle to which the disk is mounted is positioned below the body of the spindle.)

In an embodiment, the gripper is mounted on a puck that is movable on the deck.

In an embodiment, the precisor is mounted on a puck that is movable on the deck. In one embodiment, the gripper and the precisor are mounted on the same (single) puck.

In an embodiment, the puck has a receiver for receiving a said head and coarsely positioning a said head relative to the puck. This allows the operator to place the head to be tested in a receiver, using for example a pair of tweezers or a vacuum pickup tool, where the head is coarsely positioned. The head may then be transferred to the precisor using the same technique of picking up the head with the pick, moving the puck so that the destination is beneath the head, and setting down the head. The coarse precising allows the pick to pick up the head more reliably from the receiver. When unloading a head from the apparatus, the receiver may also be the final destination from which the operator removes the head from the apparatus.

In an embodiment, the pick is operable to pick up a said head from the receiver.

In an embodiment, the puck is mounted on an air bearing to move over the deck.

In an alternative arrangement, at least one of the gripper and the precisor is supported by the x-y stage.

According to a second aspect of the present invention, there is provided a method for positioning a read/write head to a disk in a testing apparatus, the method comprising: receiving the head in a precisor, the precisor being on a movable stage; accurately aligning the head relative to the movable stage with the precisor; picking up the head with the pick; moving the movable stage so that a gripper on the movable stage is positioned relative to the head such that the pick can place the head on the gripper; placing the head on the gripper; and, moving the movable stage to position the head relative to the disk.

In an embodiment, the method comprises prior to receiving the head in the precisor: placing the head in a receiver, the receiver being on the movable stage; coarsely aligning the head relative to the movable stage with the receiver; picking up the head with the pick; moving the movable stage so that the precisor is positioned relative to the head such that the pick can place the head on the precisor; placing the head on the precisor.

In an embodiment, the method comprises after moving the movable stage to position the head relative to the disk: writing/reading test data to and from the disk with the head; moving the movable stage so that the gripper is positioned relative to the head such that the pick can pick up the head; picking up the head from the gripper with the pick; moving the movable stage so that the receiver is positioned relative to the head such that the pick can place the head on the receiver; placing the head on the receiver with the pick; and, removing the head from the receiver.

In an embodiment, the movable stage is a puck that is mounted on an air bearing to move over a deck.

BRIEF DESCRIPTION OF DRAWINGS

Embodiments of the present invention will now be described by way of example with reference to the accompanying drawings, in which.

DETAILED DESCRIPTION

Figure 1:
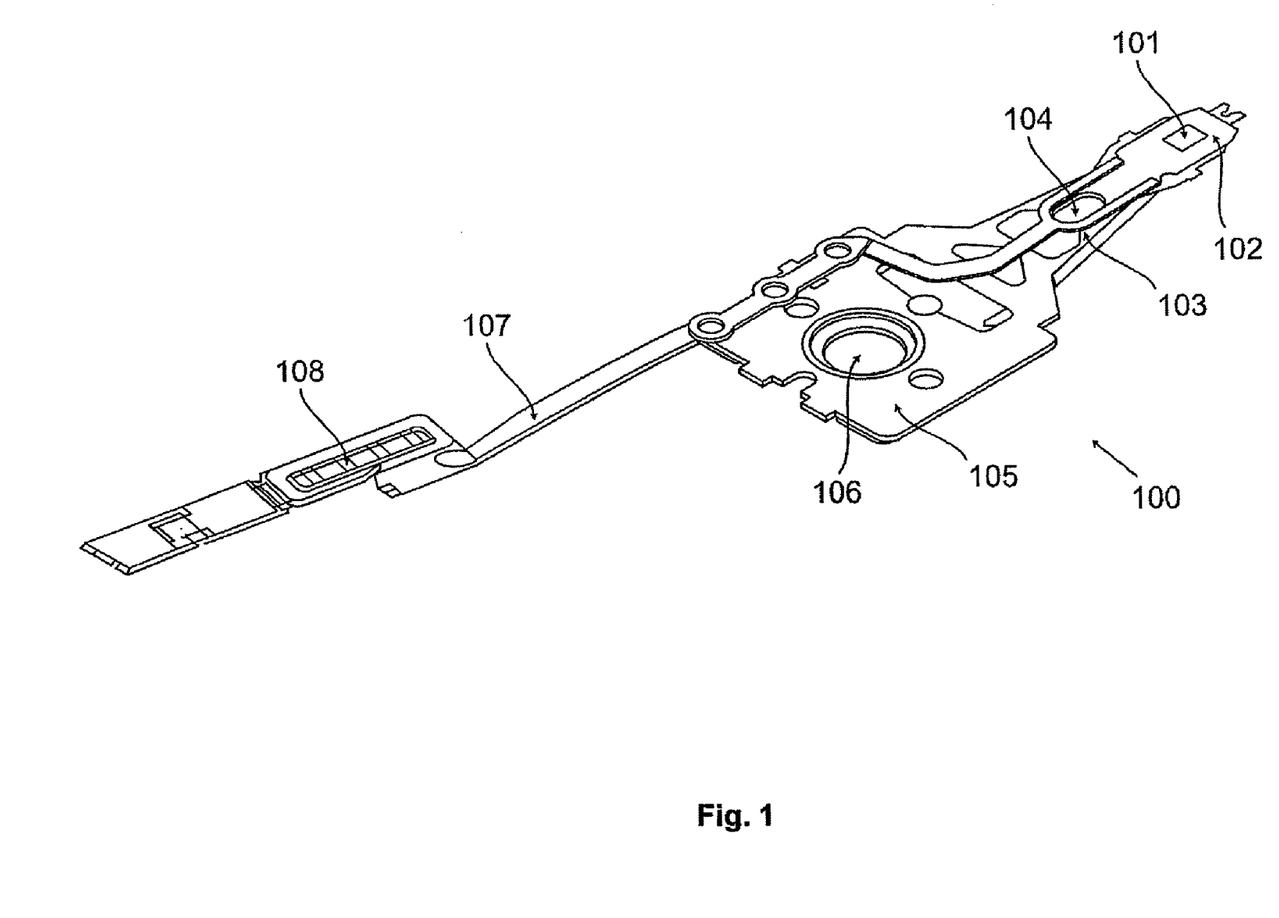
FIG. 1 shows a typical head gimbal assembly.

FIG. 1 shows a typical HGA 100 of the type testable by a spinstand. The HGA 100 has a magnetic read/write head 101 for reading from and writing to a disk. The head 101 is supported on a slider 102, which is aerodynamically shaped to "fly" the head 101 over the surface of the disk at an appropriate height for reading from and writing to the disk. The head 101 and slider 102 are attached to a suspension arm 103 or load beam. The suspension arm 103 provides suspension which is necessary when flying the head 101 over the disk surface. The suspension arm 103 also has a tooling slot 104 formed in it. The suspension arm 103 is attached to a base plate 105. The suspension arm 103 is slightly angled with respect to the base plate 105. The base plate 105 has a boss hole 106 in its centre by which the HGA 100 can be held. A flex circuit 107 runs from the head 101, is supported by the suspension arm 103 and base plate 105 and projects from the end of the base plate 105 opposite the head 101. The flex circuit 107 connects to the head 101 at one end and terminates in electrical contacts 108 at its other end. These contacts 108 allow connections to be formed to the HGA 100 by the spinstand electronics.

Figure 2:
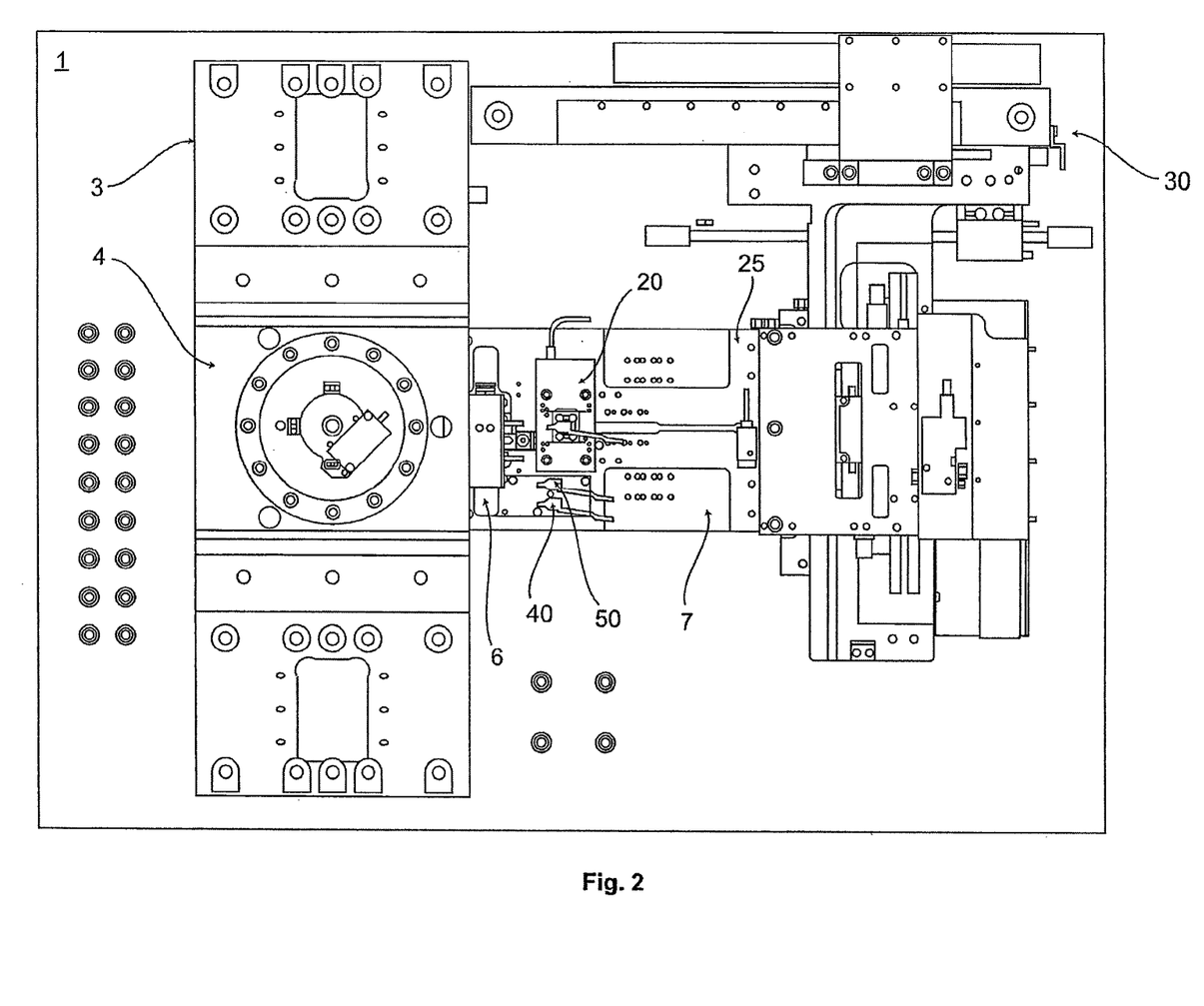
FIG. 2 shows a plan view of an example of an apparatus in accordance with an embodiment of the present invention.
Figure 3:
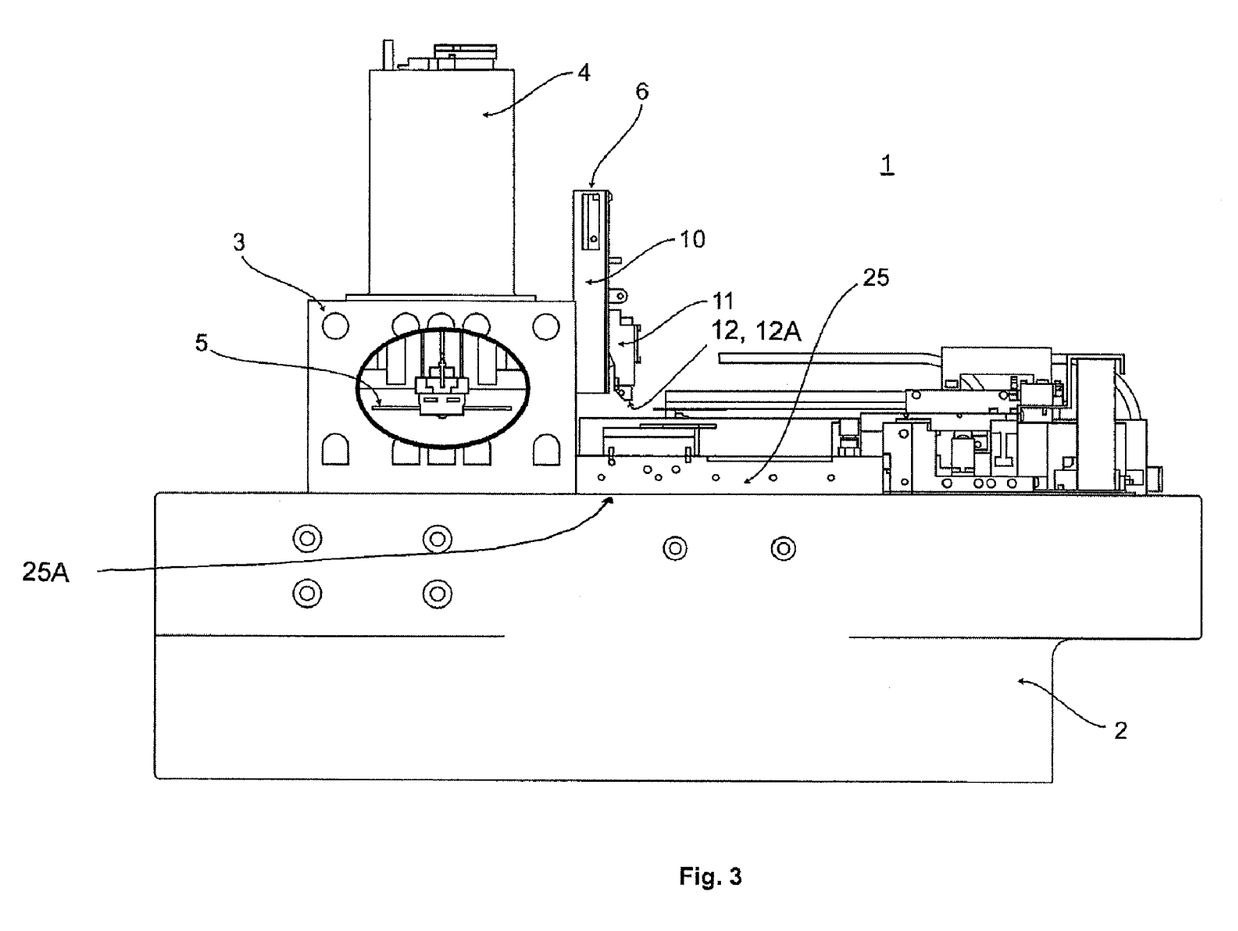
FIG. 3 shows the apparatus of FIG. 2 from the side, with a partial cutaway of the bridge to show a section of the disk attached to the spindle assembly.

Referring to FIGS. 2 and 3, a spinstand 1 comprises a deck 2. The deck 2 is made from granite and has a highly polished surface. The deck 2 is mounted on isolation mounts (not shown) to isolate the spinstand 1 from external vibrations.

The spinstand 1 has a bridge 3 mounted to the deck 2. The bridge 3 supports a spindle assembly 4 for holding a disk 5 to be tested in an inverted configuration, i.e. such that the end of the spindle assembly 4 to which the disk 5 is fixed is lowermost. The bridge 3 supports a pick device 6 attached to one of its sides. A tail flattener 7 is mounted to the bridge 3 next to the pick device 6.

As is conventional in the art, the terms x and y directions as used herein refer to orthogonal directions parallel to the surface of the deck 2 and disk 5 (i.e. the horizontal), whereas the term z-direction refers to the direction perpendicular to the deck 2 and parallel to the spindle 4 (i.e. the vertical). The terms downward or lowered are used to refer to moving perpendicularly toward the deck 2, whereas the terms upward or raised are used to refer to moving perpendicularly away from the deck 2.

As can be seen most clearly in FIG. 3, the pick device 6 comprises a mounting portion 10 for mounting to the bridge 3, a kicker 11 and an end effector 12 disposed on the end of the kicker 11. The kicker 11 is capable via air actuation or a servo controlled motor or other appropriate actuator of moving the end effector 12 very precisely in the z-direction, allowing the end effector 12 to be vertically raised or lowered.

The end effector 12 has a generally flat and square lowermost surface having four vacuum ports 12A generally adjacent each corner of the lowermost surface. These ports are connectable to a vacuum source. The ports are arranged so that they can be aligned with positions on the base plate 105 of a HGA 100.

Thus with a HGA 100 positioned beneath the pick device 6, the kicker 11 can be actuated to lower the end effector 12 to be in contact with or positioned closely above the base plate of the HGA 100. A vacuum can then be applied to the ports 12A of the end effector 12 so that ambient air pressure causes the base plate to be forced against the lower surface of the end effector 12. Thus the HGA 100 is "vacuumed" or "suctioned" onto the end effector 12 to hold it in place. The kicker 11 can then be actuated upwards, thereby picking up the HGA 100.

Figure 4:
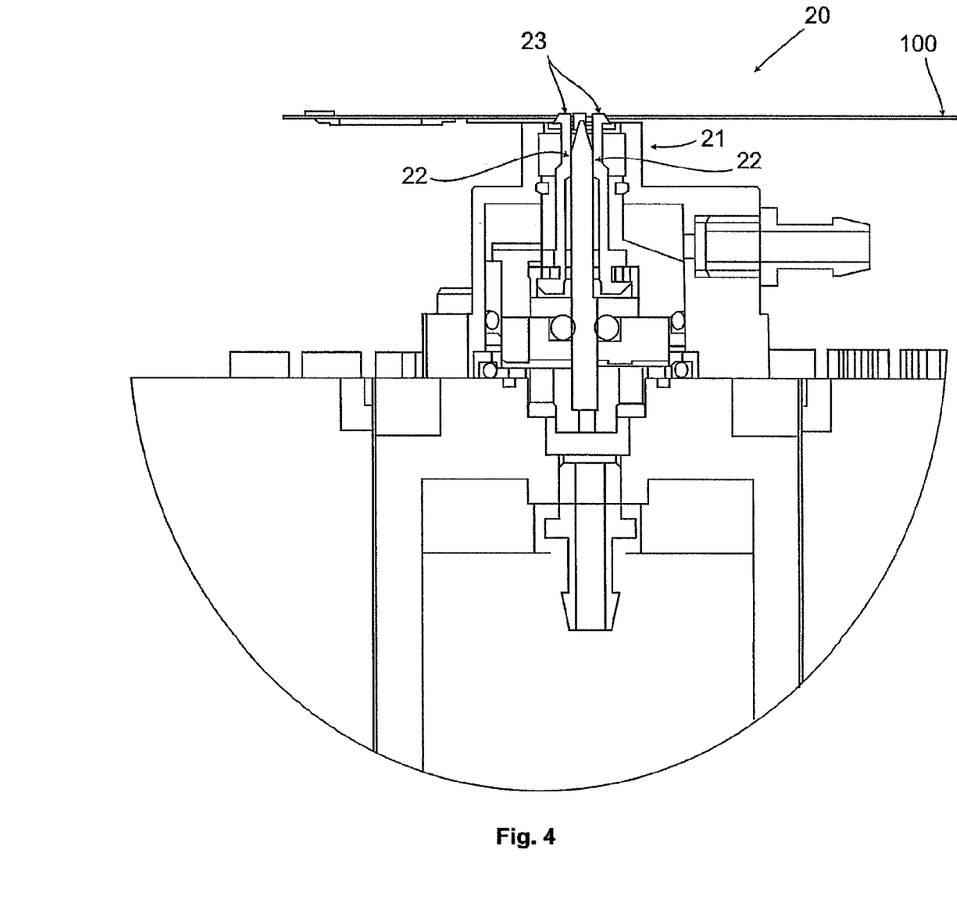
FIG. 4 shows a sectioned view of a test nest.

Referring particularly to FIGS. 2 and 4, the spinstand 1 has a so-called "test nest" 20 which is adapted to hold a HGA 100 during testing and to make electrical connections from the spinstand electronics to the HGA electrical contacts 108. The test nest 20 has a collet mechanism 21 for holding the HGA 100. The collet mechanism 21 comprises a plurality of collet fingers 22 (four in this example) having radially outwardly projecting ears 23. The collet fingers 22 can be fired or actuated upwards, by for example a pneumatic actuator, the collet fingers 22 pivoting inwardly towards each other so as to be able to pass through the boss hole 106 in the base plate 105 of a HGA 100. The collet fingers 22 can then be retracted, by for example another pneumatic actuator, so that the collet fingers 22 open outwards again such that the ears 23 engage the base plate 105 around the boss hole 106 and to pull the base plate 105 against the test nest 20. To release the HGA 100, the collet fingers 22 are actuated upwards again to release the base plate 105.

The test nest 20 in one embodiment is mounted on a movable stage that is movable over the surface of the deck 2. In the embodiment shown in the drawings, the movable stage comprises a puck 25 which is mounted on the deck 2 by an air bearing 25A (as shown in FIG. 3), and is positioned by a highly accurate x-y positional stage 30, also supported by air bearings (not shown) and having linear encoders (not shown) to allow the position of the puck 25 to be highly accurately determined. The puck 25 is capable of moving the head to a desired location with great precision. In particular, the puck 25 is used during testing to move the head 101 under the surface of the disk 5, for example to a particular track on the disk 5. The puck 25 and the x and y elements of the x-y stage 30 can be locked down to the surface of the deck 2 by application of a vacuum. This helps prevent movement of the puck 25 when in a desired position. Other arrangements of the test nest 20 and the x-y positional stage 30 are possible. For example, a stacked arrangement is possible, where the test nest 20 is supported on a movable stage which is carried on top of the x-y positional stage 30, rather than having the test nest 20 on a puck 25 that is directly on top of the deck 2. Similarly, the x and y elements of the x-y positional stage 30 may be stacked one upon the other, rather than both being directly on top of the deck 2.

The puck 25 also has a load/unload mechanism (not shown) for loading/unloading the head 101 to/from the test surface of the disk 5 in order to position the head 101 at the correct z-height and to be horizontal for reading from and writing to a track of test data on the test surface of the disk 5. The puck 25 also has a nanopositioner (not shown) disposed between the puck 25 and the test nest 20, which allows very fine positional changes of the head 101 to be made relative to the test track.

As will be described in more detail below, the puck 25 of this embodiment also supports a receiver or coarse precisor 40 and a fine precisor 50. The coarse precisor 40 provides a receiving point in the apparatus where the operator can easily place a HGA 100 to be tested. Placing the HGA 100 on the coarse precisor 40 provides a general positioning to the HGA 100. This general positioning is just accurate enough to enable the apparatus 1 to automatically pick up the HGA 100 and transfer the HGA 100 to the fine precisor 50, where the HGA is given the highly accurate positioning required for testing. This highly accurate positioning of the HGA 100 is maintained by the apparatus when subsequently loading the head 101 to the disk 5.

Figure 5:
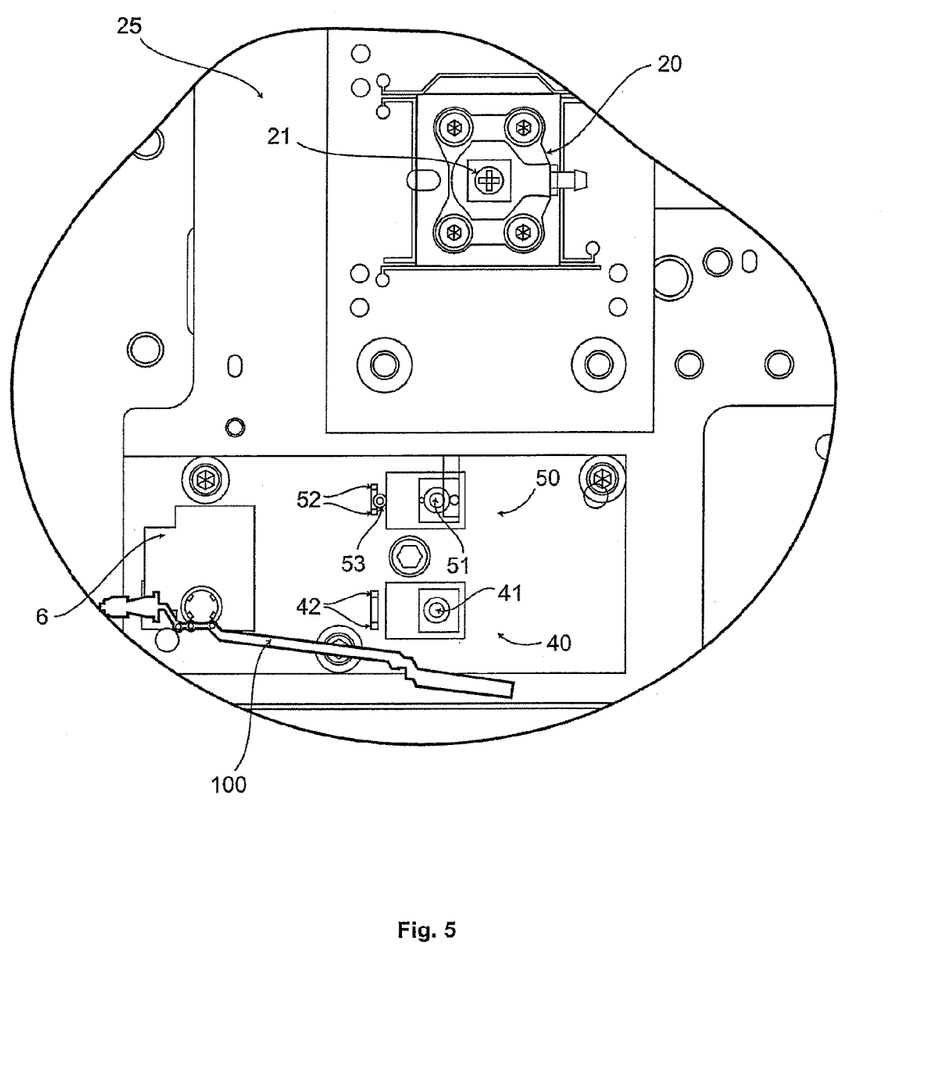
FIG. 5 shows an enlarged view of part of the apparatus of FIG. 2.

Referring particularly to FIG. 5, the coarse precisor 40 has a boss pin 41 and a pair of "goalposts" 42 in the form of pins projecting upwards from the uppermost surface of the puck 25. The boss pin 41 is tapered moving upwards away from the puck 25 so as to be generally conical. The goalposts 42 converge towards each other moving towards the puck 25. When a HGA 100 is appropriately placed on the coarse precisor 40, the boss pin 41 engages with the boss hole 106 in the base plate 105 of the HGA 100, thereby positioning the HGA 100 in the x-y direction. The goalposts 42 accept the suspension arm 103 between and give a rough theta positioning to the HGA 100 as the HGA 100 is advanced downward onto the coarse precisor 40 due to the converging pins guiding the suspension arm 103 between them. A further pin (not shown) may be provided near the goalposts 42 for engagement with the tooling slot 104 of the HGA 100 in order to improve the positioning achieved with the coarse precisor 40.

The fine precisor 50 also has a tapered boss pin 51 for engaging with the boss hole 106 of the base plate 105 of a HGA 100 and thereby positioning it in the x-y direction. The fine precisor 50 may also have a set of goalposts 52 that converge towards each other on moving towards the puck 25 and which help guide the HGA 100 into the fine precisor 50. The fine precisor 50 also has a tapered theta pin 53 for engaging with the tooling slot 104 of the suspension arm 103 of the HGA 100. When a HGA 100 is placed onto the fine precisor 50, the boss pin 51 engages with the boss hole 106 of the HGA 100 and the theta pin 53 engages with the tooling slot 104 of the HGA 100, thereby finely positioning the HGA 100 in the x-y position and the theta directions.

As well as being positionable to position the head 101 under the disk 5 as described above, the puck 25 can be moved such that each of the test nest 20, the fine precisor 50 and the coarse precisor 40 can in turn lie underneath the end effector 12 of the pick device 6. In order to move the HGA 100 between any of the test nest 20, the fine precisor 50 and the coarse precisor 40, the following steps are performed:
1. The puck 25 is moved so that the base plate 105 of the target HGA 100 (being initially positioned on one of the test nest 20, the fine precisor 50 and the coarse precisor 40) is under the end effector 12.
2. The kicker 11 is actuated downwards so that the end effector 12 is in contact with the base plate 105 of the HGA 100.
3. A vacuum is applied to the ports 12A of the end effector 12, thereby causing it to hold the HGA 100.
4. The kicker 11 is actuated upwards, thereby picking up the HGA 100.
5. The puck 25 is moved so that the destination location (being another one of the test nest 20, the fine precisor 50 and the coarse precisor 40) is under the end effector 12.
6. The kicker 11 moves down, placing the HGA 100 in the destination location.
7. The vacuum is removed from the ports 12A of the end effector 12.
8. The kicker 11 is actuated upwards, leaving the HGA 100 in its new position on the puck 25.

In effect then, in being moved between the coarse precisor 40, the fine precisor 50 and the test nest 20, the HGA 100 is kept effectively stationary in the x-y direction. The HGA 100 is simply raised and lowered by the pick device 6, whilst the coarse precisor 40, the fine precisor 50 and the test nest 20 are moved by the puck 25 to come to the HGA 100 in the x-y direction. This is advantageous because spinstands 1 typically already have a very precise x-y positioner 30 for moving the puck 25 so that the head 101 can be loaded to the disk 5. Thus by using the existing puck 25 and its very precise x-y positioner 30 in moving the HGA 100 between the coarse precisor 40, the fine precisor 50 and the test nest 20, this avoids the need for another x-y positioner 30. Also, keeping the HGA 100 effectively stationary in the x-y directions largely avoids any possibility that the x-y positioning or the theta orientation of the HGA 100, having been provided by either of the precisors, is compromised in moving the head 101 to the test nest 20. Also, the kicker 11 only has to move vertically, thereby making it easier for it not to compromise the precision of the x-y position of the HGA 100.

In use, a HGA 100 to be tested is first placed manually in the coarse precisor 40 by an operator so that the boss pin 41 goes through the boss hole 106 of the HGA 100. The goal posts 42 ensure that the HGA 100 is positioned with a rough amount of theta precision. Having placed the HGA 100 in the coarse precisor 40, the operator presses a button or otherwise signals to the apparatus that there is a HGA 100 in place and for testing to begin.

Next, the HGA 100 is moved from the coarse precisor 40 to the fine precisor 50, using the puck 25 and the pick device 6 following the sequence of actions described above. When the kicker 11 actuates downwards to place the HGA 100 on the fine precisor 50, the boss hole 106 of the HGA 100 engages with the boss pin 51 of the fine precisor 50 and the tooling slot 104 of the HGA 100 engages with the theta pin 53 of the fine precisor 50. If the HGA 100 is out of theta alignment with the fine precisor 50, then one of the sides of the tooling slot 104 will contact the conical theta pin 53 before the HGA 100 is fully seated on the pins 51,53, causing the HGA 100 to swivel about the boss pin 51 until the HGA 100 is in close theta alignment with the fine precisor 50. It should be noted that the end effector 12 allows this swivelling to take place because its hold on the base plate 106 is not so strong as to prevent swivelling, its hold being only strong enough to hold the HGA 100 securely in the absence of external forces acting on HGA 100. When the theta precisor pin 53 passes precisely through the centre of the tooling slot 104, the theta alignment is set and no more swivelling takes place. As the HGA 100 is pushed further onto the boss pin 51, the suspension arm 103 of the HGA 100 flexes in a vertical direction (as it does when the head 101 is loaded against the disk 5). The translational (x-y position) and angular position (theta position) of the HGA 100 are now precisely set.

Next, the HGA 100 is then moved from the fine precisor 50 to the collet mechanism 21 of the test nest 20, using the puck 25 and the pick device 6 following the sequence of actions described above. In this sequence, after the kicker 11 has been actuated downwards to place the HGA 100 onto the test nest 20 but before the vacuum is removed from the ports of the end effector 12, the test nest collet 21 is fired to expand in the boss hole of the HGA 100. This grips the HGA 100 firmly to the test nest 20. The tail flattener 7, mounted adjacent to the pick device 6 on the bridge 3, is actuated to press down on the tail 107 of the flexible circuit to hold it in position whilst electrical connections are made to it by the test nest 20. The kicker 11 is then actuated upwards, so as to be out of the way, and the puck 25 is moved to position the head 101 under the disk 5 so that testing can take begin.

When testing is complete the HGA 100 is moved directly from the test nest 20 to the coarse precisor 40, using the puck 25 and the pick device 6 following the sequence of actions described above. The HGA 100 is then removed by the operator.

In another embodiment, a coarse precisor 40 is not provided at all. In this embodiment, the operator places the HGA 100 directly on the fine precisor 50. The automation then moves the HGA 100 from the fine precisor 50 to the test nest 20, using the puck 25 and the pick device 6 following the sequence of actions described above. The HGA 100 is then tested as before. After the HGA 100 has been tested, the automation then moves the HGA 100 back from the test nest 20 to the fine precisor 50, using the puck 25 and the pick device 6 following the sequence of actions described above. The HGA 100 is then removed by the operator.

Embodiments of the present invention have been described with particular reference to the example illustrated. However, it will be appreciated that variations and modifications may be made to the examples described within the scope of the present invention. For example, the invention is not limited to the specific spindle types or arrangements, or puck 25 positioning devices, or actuators specifically described in the description.

The invention claimed is:

1. Apparatus for receiving and positioning a read/write head to a disk in a test apparatus, the apparatus comprising:
    a deck;
    a spindle on the deck and on which said disk can be mounted for rotation of the disk;
    a gripper for holding said head during testing, the gripper being movable over a surface of the deck;
    a precisor for receiving said head and accurately aligning said head, the precisor being movable over a surface of the deck so as to move said head received by the precisor over a surface of the deck; and,
    a pick operable to pick up and place down said head;
    the precisor being movable to a position where the pick can pick up said head from the precisor and place down said head on the precisor;
    the gripper being movable to a position where the pick can pick up said head from the gripper and place down said head on the gripper.

2. Apparatus according to claim 1, wherein the pick is operable to pick up said head from the gripper.

3. Apparatus according to claim 1, wherein the pick is in a fixed position relative to the deck.

4. Apparatus according to claim 3, wherein the pick comprises:
    a kicker capable of movement in a substantially vertical direction; and,
    an end effector attached to the kicker capable of holding said head.

5. Apparatus according to claim 4, wherein the end effector is arranged to hold said head in the Z-direction while allowing at least some degree of x-y movement and swivelling of said head to aid the fine positioning of the head when said head is placed on the precisor.

6. Apparatus according to claim 4, wherein the end effector comprises at least one vacuum port for applying a vacuum to said head in order to hold said head.

7. Apparatus according to claim 1, comprising a positioning stage on the deck for moving at least one of the gripper and the precisor relative to the deck.

8. Apparatus according to claim 1, wherein the pick is mounted on a member that holds an inverted spindle.

9. Apparatus according to claim 1, wherein the gripper is mounted on a puck that is movable on the deck.

10. Apparatus according to claim 1, wherein the precisor is mounted on a puck that is movable on the deck.

11. Apparatus according to claim 9, wherein the puck has a receiver for receiving said head and coarsely positioning said head relative to the puck.

12. Apparatus according to claim 11, wherein the pick is operable to pick up said head from the receiver.

13. Apparatus according to claim 9, wherein the puck is mounted on an air bearing to move over the deck.

14. Apparatus according to claim 1, comprising a x-y stage, wherein the gripper is supported by the x-y stage.

15. Apparatus according to claim 1, comprising a x-y stage, wherein the precisor is supported by the x-y stage.

16. Apparatus according to claim 9, comprising a x-y stage, wherein the precisor is supported by the x-y stage.

17. A method for positioning a read/write head to a disk in a testing apparatus, the apparatus comprising a deck; a spindle on the deck and on which said disk can be mounted for rotation of the disk; a gripper for holding said head during testing, the gripper being movable over a surface of the deck; a precisor for receiving said head and accurately aligning said head, the precisor being movable over a surface of the deck so as to move said head received by the precisor over a surface of the deck; and, a pick operable to pick up and place down said head; the precisor being movable to a position where the pick can pick up said head from the precisor and place down said head on the precisor; the gripper being movable to a position where the pick can pick up said head from the gripper and place down said head on the gripper, the method comprising:
    receiving the head in the precisor, the precisor being on a movable stage capable of moving said head received by the precisor over a surface of the deck;
    accurately aligning the head relative to the movable stage with the precisor;
    picking up the head with the pick;
    moving the movable stage so that the gripper on the movable stage is positioned relative to the head such that the pick can place the head on the gripper;
    placing the head on the gripper; and,
    moving the movable stage to position the head relative to the disk.

18. A method according to claim 17, comprising prior to receiving the head in the precisor:
    placing the head in a receiver, the receiver being on the movable stage;
    coarsely aligning the head relative to the movable stage with the receiver;
    picking up the head with the pick;
    moving the movable stage so that the precisor is positioned relative to the head such that the pick can place the head on the precisor;
    placing the head on the precisor.

19. A method according to claim 18, comprising after moving the movable stage to position the head relative to the disk:
    writing/reading test data to and from the disk with the head;
    moving the movable stage so that the gripper is positioned relative to the head such that the pick can pick up the head;
    picking up the head from the gripper with the pick;
    moving the movable stage so that the receiver is positioned relative to the head such that the pick can place the head on the receiver;
    placing the head on the receiver with the pick; and, removing the head from the receiver.

20. A method according to claim 17, wherein the movable stage is a puck that is mounted on an air bearing to move over a deck.

* * * * *